(12) United States Patent
Struble, III

(10) Patent No.: US 12,704,365 B2
(45) Date of Patent: Aug. 11, 2026

(54) REINFORCEMENT STRIP FOR ROLL-OVER RESISTANT MEASURING TAPE

(71) Applicant: Apex Brands, Inc., Apex, NC (US)

(72) Inventor: Robert Osborne Struble, III, Fuquay Varina, NC (US)

(73) Assignee: Apex Brands, Inc., Apex, NC (US)

( * ) Notice: Subject to any disclaimer, the term of this patent is extended or adjusted under 35 U.S.C. 154(b) by 470 days.

(21) Appl. No.: 18/272,159

(22) PCT Filed: Jan. 21, 2022

(86) PCT No.: PCT/US2022/013214

§ 371 (c)(1),
(2) Date: Jul. 13, 2023

(87) PCT Pub. No.: WO2022/159643

PCT Pub. Date: Jul. 28, 2022

(65) Prior Publication Data

US 2024/0077294 A1 Mar. 7, 2024

Related U.S. Application Data

(60) Provisional application No. 63/140,022, filed on Jan. 21, 2021.

(51) Int. Cl.
*G01B 3/1003* (2020.01)

(52) U.S. Cl.
CPC .................................. *G01B 3/1003* (2020.01)

(58) Field of Classification Search
CPC .................................................... G01B 3/1003
See application file for complete search history.

(56) References Cited

U.S. PATENT DOCUMENTS

| | | | | |
|---|---|---|---|---|
| 2,319,724 | A | 5/1943 | Dinhofer | |
| 4,411,072 | A * | 10/1983 | Rutty | G01B 3/1003 242/405 |
| 4,429,462 | A * | 2/1984 | Rutty | G01B 3/1003 242/405 |
| 5,226,724 | A | 7/1993 | Kanarek | |
| 6,804,899 | B2 * | 10/2004 | Murray | G01B 3/10 33/771 |

(Continued)

OTHER PUBLICATIONS

International Search Report and Written Opinion from International Application No. PCT/US2022/013214 mailed Apr. 6, 2022; all pages cited in its entirety.

*Primary Examiner* — Yaritza Guadalupe-McCall
(74) *Attorney, Agent, or Firm* — Burr & Forman

(57) ABSTRACT

A blade for a measuring tape device may include a first end at which an end hook is configurable, a second end configured to be operably coupled to a reel assembly of the measuring tape device, a metallic strip of material extending between the first end and second end, and a reinforcement strip applied to a longitudinal centerline of a selected portion of the metallic strip proximate to the first end. The reinforcement strip may be applied to a top or bottom of the metallic strip. A width of the reinforcement strip may be between about 10% to about 100% of a width of the metallic strip and a thickness of the reinforcement strip may be between about 50% to about 300% a thickness of the metallic strip.

20 Claims, 11 Drawing Sheets

(56) References Cited

U.S. PATENT DOCUMENTS

| | | | | |
|---|---|---|---|---|
| 6,907,676 | B2 * | 6/2005 | Liao | G01B 3/1003 |
| | | | | 33/757 |
| 6,959,500 | B2 * | 11/2005 | Liao | G01B 3/1003 |
| | | | | 33/771 |
| 7,159,331 | B2 * | 1/2007 | Critelli | G01B 3/1003 |
| | | | | 33/771 |
| 10,697,747 | B1 * | 6/2020 | Vitas | G01B 3/1041 |
| 10,712,142 | B2 * | 7/2020 | Vitas | G01B 3/1041 |
| 11,022,416 | B2 * | 6/2021 | Vitas | G01B 3/1003 |
| 11,293,739 | B2 * | 4/2022 | Vitas | G01B 3/1003 |
| 11,656,067 | B2 * | 5/2023 | Vitas | G01B 3/1003 |
| | | | | 33/771 |
| 11,662,193 | B2 * | 5/2023 | Khangar | G01B 3/1041 |
| | | | | 33/759 |
| 12,038,272 | B2 * | 7/2024 | Vitas | G01B 1/00 |
| 12,467,730 | B2 * | 11/2025 | Vitas | G01B 3/1003 |
| 2013/0067759 | A1 * | 3/2013 | Murray | G01B 3/1003 |
| | | | | 33/761 |
| 2019/0242686 | A1 * | 8/2019 | Reddy | G01B 3/1005 |
| 2020/0225017 | A1 * | 7/2020 | Orsini | G01B 3/1056 |
| 2024/0077294 | A1 * | 3/2024 | Struble, III | G01B 3/1003 |
| 2026/0043643 | A1 * | 2/2026 | Khangar | G01B 1/00 |

* cited by examiner 140
170

170
140

140
200
310
210
310

140
200
320
210

140
400
400
410

210
420
200
Wt
Ws 200
400
400
430
210

440
440
200
Wt
Ws 140
400
400

450
460
200
460
210
Wt
Ws

REINFORCEMENT STRIP FOR ROLL-OVER RESISTANT MEASURING TAPE

TECHNICAL FIELD

Example embodiments generally relate to measuring tape devices, and particularly relate to a measuring tape that has a blade designed to reduce the incidence of roll-over responsive to blade extension.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For measuring tapes having length in a range of about 12 ft to 50 ft, self-retracting mechanisms and using metallic tape ribbons for the tape (or blade) are very common.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing the end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, the collapse that occurs at maximum standout is not the only type of tape bending or collapse that can occur with metallic tape ribbons. In this regard, another collapse phenomena that can occur is called rollover. Rollover occurs when the blade is rotated about the longitudinal axis of the blade. The rotation of the blade about the longitudinal axis may be desirable when measuring vertical surfaces (e.g., walls, doors, windows, etc.).

For maximum standout, the blade is extended with the apex of the convex side of the cupped shape pointing straight toward the ground. As the blade is rotated about the longitudinal axis and extended, even typical blades that are designed for long standout will tend to collapse when the angle of rotation nears 90 degrees at a relatively small amount of extension. Meanwhile, standout characteristics of some blades may enable extension of greater than 10 feet or 12 feet. Thus, it may be desirable to improve anti-rollover characteristics to decrease the gap between the maximum standout and the length at which rollover occurs.

BRIEF SUMMARY OF SOME EXAMPLES

Some example embodiments may enable the provision of a measuring tape that has improved anti-rollover characteristics.

In an example embodiment, a measuring tape device may be provided. The device may include a housing having an aperture, a reel assembly enclosed within the housing, and a blade formed from a metallic strip of material having a first end configured to extend from the housing through the aperture and a second end configured to be wound on the reel assembly. The blade may further include a reinforcement strip applied to a longitudinal centerline of a selected portion of the metallic strip proximate to the first end. The reinforcement strip may be applied to a top and/or bottom of the metallic strip. A width of the reinforcement strip may be between about 10% to about 100% of a width of the metallic strip and a thickness of the reinforcement strip is between about 50% to about 300% a thickness of the metallic strip.

In another example embodiment, a blade for a measuring tape device may be provided. The blade may include a first end at which an end hook is configurable, a second end configured to be operably coupled to a reel assembly of the measuring tape device, a metallic strip of material extending between the first end and second end, and a reinforcement strip applied to a longitudinal centerline of a selected portion of the metallic strip proximate to the first end. The reinforcement strip may be applied to a top and/or bottom of the metallic strip. A width of the reinforcement strip may be between about 10% to about 100% of a width of the metallic strip and a thickness of the reinforcement strip may be between about 50% to about 300% a thickness of the metallic strip.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
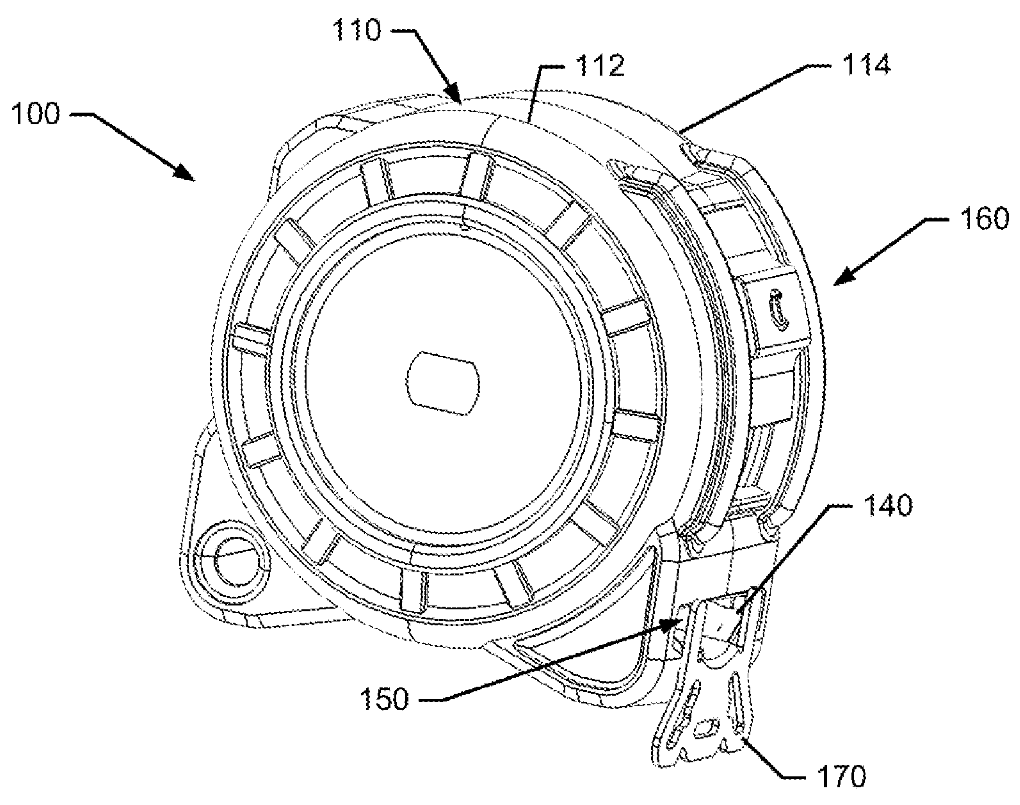
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term “or” is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved blade design for resistance to rollover. This may be accomplished by providing an anti-rollover treatment to the apex of the top and/or bottom of the blade extending away from the end hook, and over a limited length of the blade (e.g., 12 inches to 96 inches). FIG. 1 illustrates a perspective view of a measuring tape device, FIG. 2 illustrates a block diagram of such device, in accordance with an example embodiment, and FIG. 3 (which is defined by FIGS. 3A and 3B) illustrates a front view of the blade of the measuring tape device.

Figure 2:
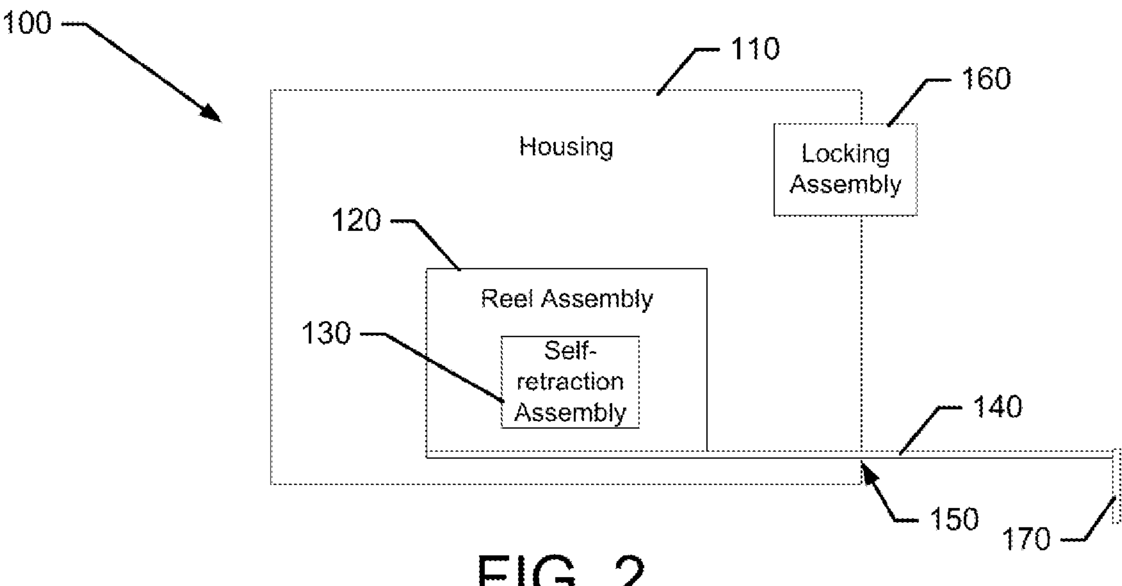
FIG. 2 illustrates a block diagram of the measuring tape device in accordance with an example embodiment.
Figure 3A:
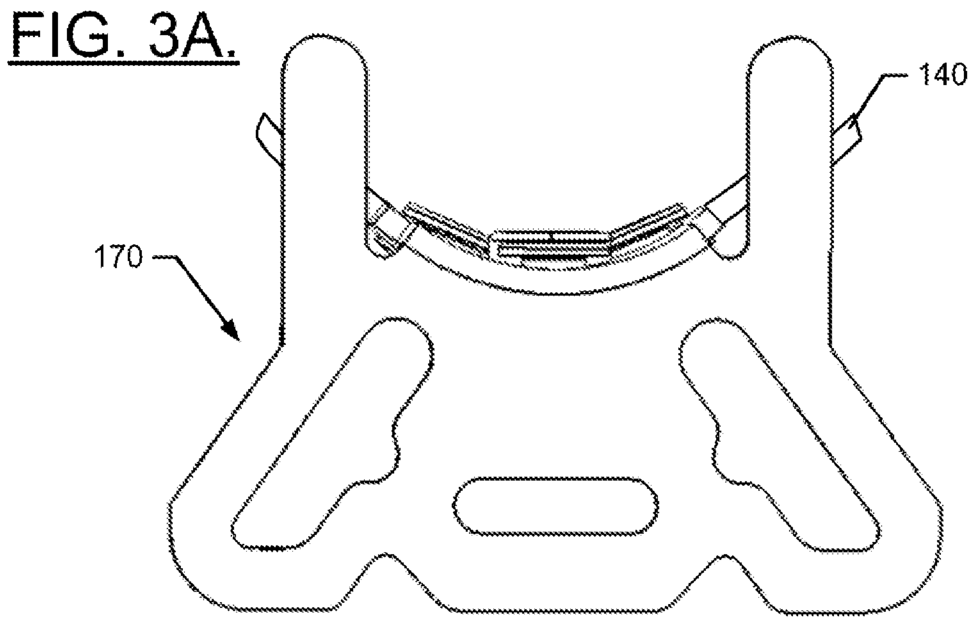
FIG. 3A illustrates a front view of the end hook in a normal orientation in accordance with an example embodiment.

Referring now to FIGS. 1-3, a measuring tape device 100 of an example embodiment may include a housing 110 that, to simplify manufacture, may include a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 at a length of maximum standout generally occurs at a portion of the blade 140 that can be referred to as a “critical region” since it can occur at slightly different points (but generally in the same region) on different extension operations, and on different individual measuring tapes.

Figure 3B:
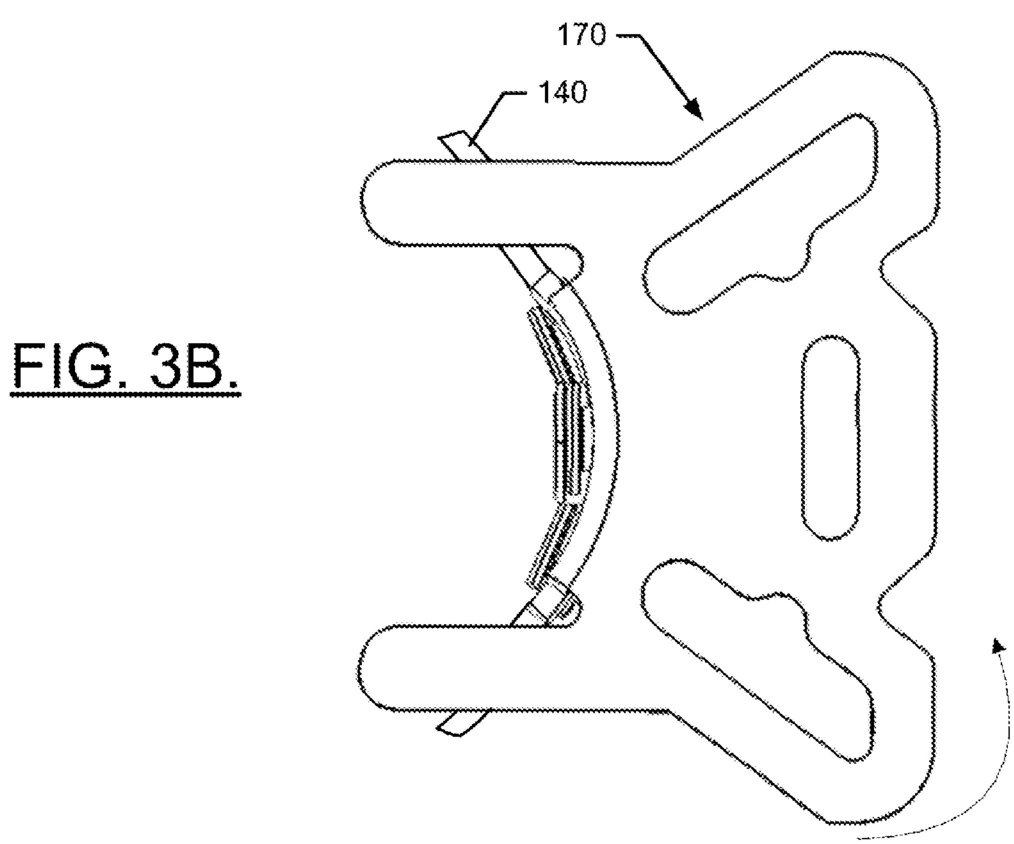
FIG. 3B illustrates the end hook rotated about ninety degrees about a longitudinal axis of the blade in accordance with an example embodiment.

It may be possible to increase the standout capabilities of the blade 140 by changing certain characteristics of the blade 140. For example, the cupping of the blade 140 such that a convex curve having an apex that is generally faced toward the ground when the blade 140 is extended to achieve maximum standout is well known to improve standout of the blade 140. This is the orientation shown in FIG. 3A. However, the blade 140 is not always paid out (or held) in this orientation. To the contrary, in some cases, measurement of vertical surfaces or structures may call for paying the blade 140 out of the housing 110 at an angled orientation (e.g., rotated about the longitudinal axis of the blade 140 as much as by 90 degrees, and generally at greater than 60 degrees). FIG. 3B shows the blade 140 and end hook 170 rotated by 90 degrees so that the apex of the convex side of the cupped blade is now rotated 90 degrees and to the viewer's right. For a typical blade that is constructed to have improved standout, a collapse or bending phenomenon referred to as rollover (which is similar to that which occurs at maximum standout in terms of the collapse or bending of the blade 140 that occurs) can occur at a corresponding critical region for rollover. The critical region for rollover for many cupped blades often tends to occur at between two and three feet of extension out of the housing 110.

Figure 4:
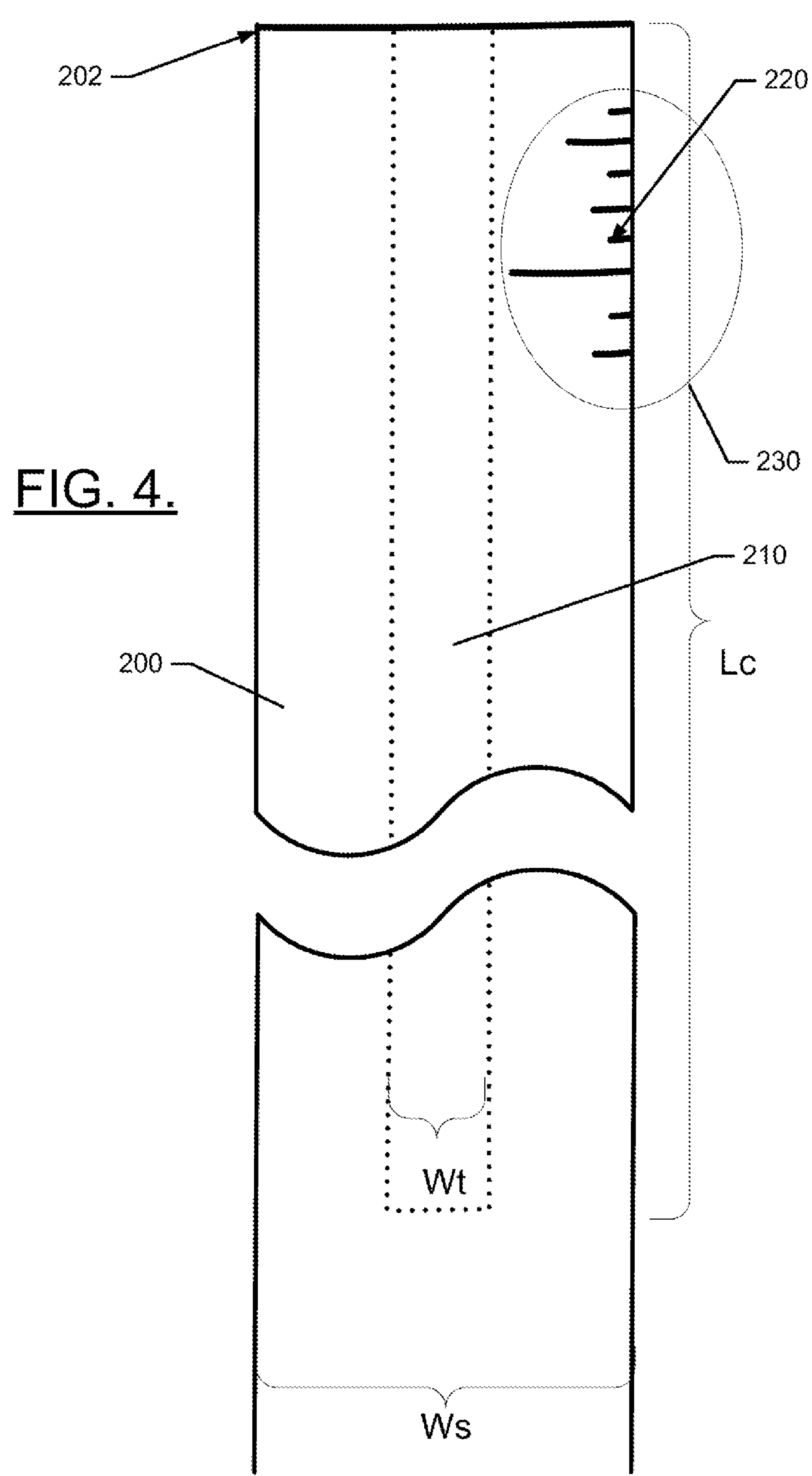
FIG. 4A illustrates a top plan view of a metallic strip having rollover treatment of an example embodiment applied thereto.

This critical region for rollover can, however, be extended by modifying the structure of the blade 140 (or at least the portion extending rearward from the end hook 170 for a given distance). In this regard, by adding an anti-rollover treatment to an apex portion of the blade 140 over the given distance, the amount of extension of the blade 140 that can be achieved before rollover occurs may be increased. FIG. 4 illustrates one example of how this treatment may be accomplished.

FIG. 4 illustrates a top (or bottom) view of an elongate metallic strip 200 that may ultimately be formed into the blade 140. In this regard, the metallic strip 200 may have a width (Ws) that is substantially consistent over the entire length of the metallic strip 200. Meanwhile, the length of the metallic strip 200 may be selected for a standard length of a tape measure device (e.g., 12 ft., 25 ft., 50 ft., etc.). To apply the anti-rollover treatment of an example embodiment, a reinforcement strip 210 may be applied to the top and/or bottom of the metallic strip 200. In some cases, a selected length (Lc) of the metallic strip 200 (e.g., Lc=about 12 inches up to about 96 inches from a first end 202 (to which the end hook 170 is applied)) may have the reinforcement strip 210 applied thereto at a longitudinal center of the metallic strip 200. This will be the apex of the blade 140 before or after cupping, film application, painting or other processing is completed.

The reinforcement strip 210 may typically extend continuously from the first end 202 to the selected length (Lc). However, in some embodiments, the application of the reinforcement strip 210 may not necessarily need to go all the way to the first end 202. As such, for example, the reinforcement strip 210 may start from a location spaced apart from the first end 202 and then extend to the selected length (Lc). The amount of spacing provided from the first end 202 may be, for example, 0 to 24 inches in some cases. Additionally, instead of being continuous (i.e., where the reinforcement strip 210 is one unitary piece of material), the reinforcement strip 210 may instead be embodied as multiple individual strips that combine to form the reinforcement strip 210. In some example embodiments, the reinforcement strip 210 (and the metallic strip 200) may be made of steel. However, other rigid metals or materials may also be employed in alternative embodiments.

The reinforcement strip 210 may be applied before or after cupping of the metallic strip 200. In an example embodiment, the reinforcement strip may be cut to have a width (Wt) that defines a treatment width for the metallic strip 200 in the formation of blade 140. The width (Wt) may be selected to have any desirable width. However, in some examples, the width (Wt) may be selected to have a width of about 5 mm to about 25 mm. For a nominal 1 inch width blade 140, 5 mm may represent about 20% of the width of the blade 140. However, for larger or smaller width blades, the width (Wt) may be selected to be as little as 10% of the width of the blade 140 or as much as 70% (even extending sometimes to as much as 100%) of the width of the blade 140. By keeping the reinforcement strip 210 relatively narrow compared to the width (Ws) of the metallic strip 200, any reference markings 220 (shown for example in detail window 230) may not be impacted by the reinforcement strip 210.

A thickness of the reinforcement strip 210 may also be selected based on a thickness of the metallic strip 200. For example, the thickness of the reinforcement strip 210 may be between about 50% to about 300% of the thickness of the metallic strip 200 in some embodiments. Moreover, the thickness and/or the width (Wt) of the reinforcement strip 210 could either be consistent (i.e., the same) over the entire treatment length (Lc), or either or both of the thickness and the width (Wt) of the reinforcement strip 210 may taper along the length of the reinforcement strip 210.

Figure 5A:
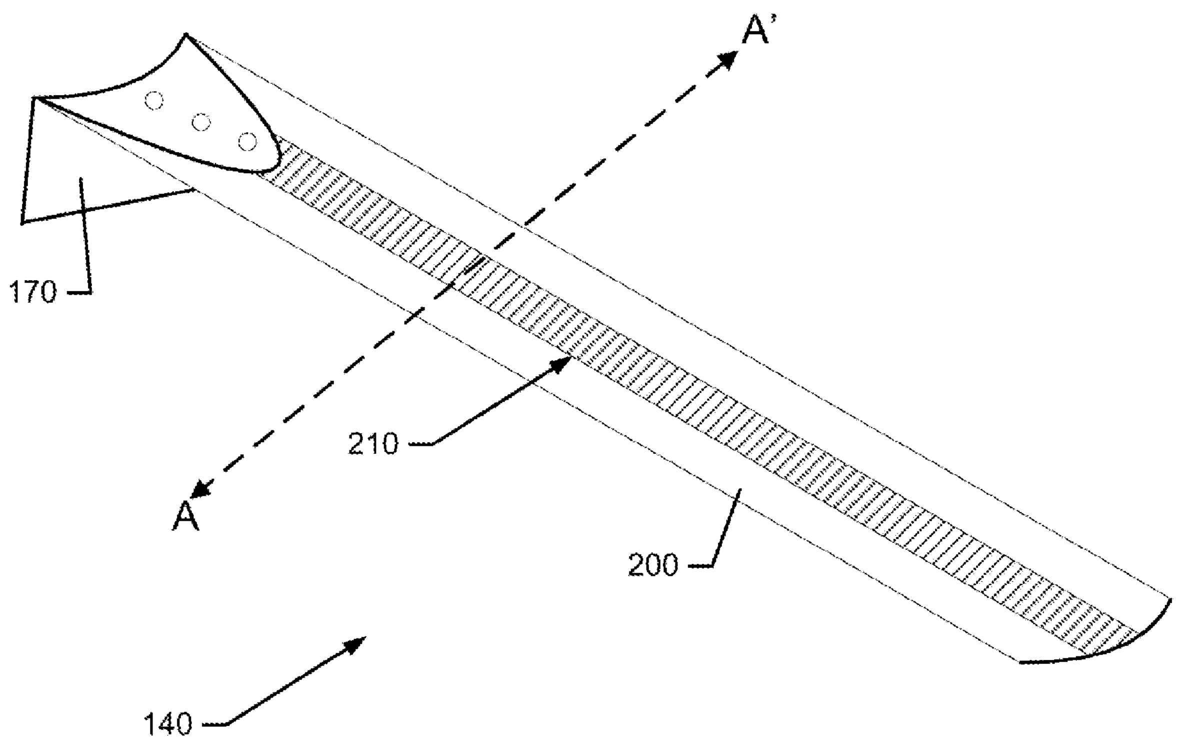
FIG. 5A illustrates a perspective view of the top of the blade with anti-rollover treatment according to an example embodiment.
Figure 5B:
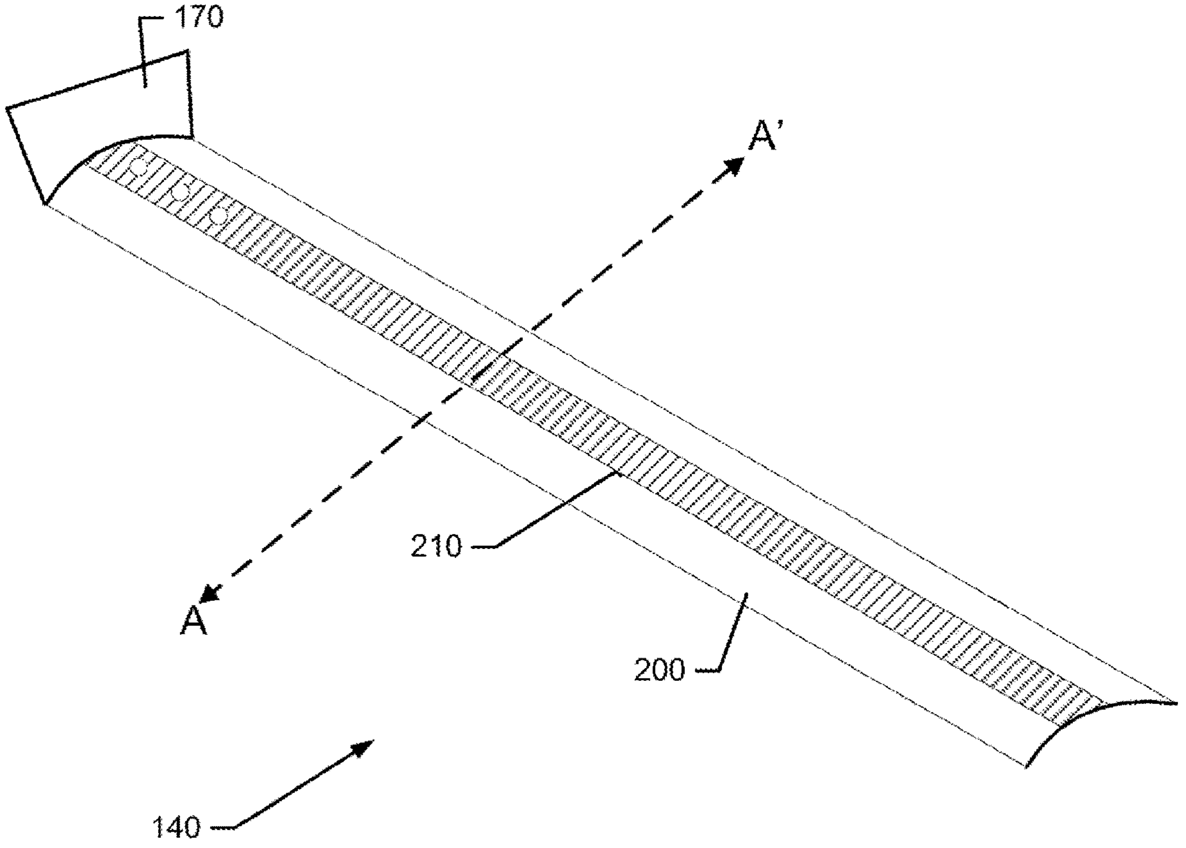
FIG. 5B illustrates a perspective view of the bottom of the blade with anti-rollover treatment according to an example embodiment.

The reinforcement strip 210 may be retained to a top portion of the metallic strip 200 (see FIG. 5A) and/or a bottom portion of the metallic strip 200 (see FIG. 5B) via any of a number of different methods. The methods will be described in relation to FIGS. 6 and 7. In this regard, FIG. 6, which is defined by FIGS. 6A, 6B, 6C, 6D and 6E, illustrates cross section views of the blade 140 taken along line A-A' in FIGS. 5A and 5B.

Figure 6A:
FIG. 6A illustrates a cross section view of the blade with a reinforcement strip applied to a top portion of a metallic strip according to an example embodiment.
Figure 6B:
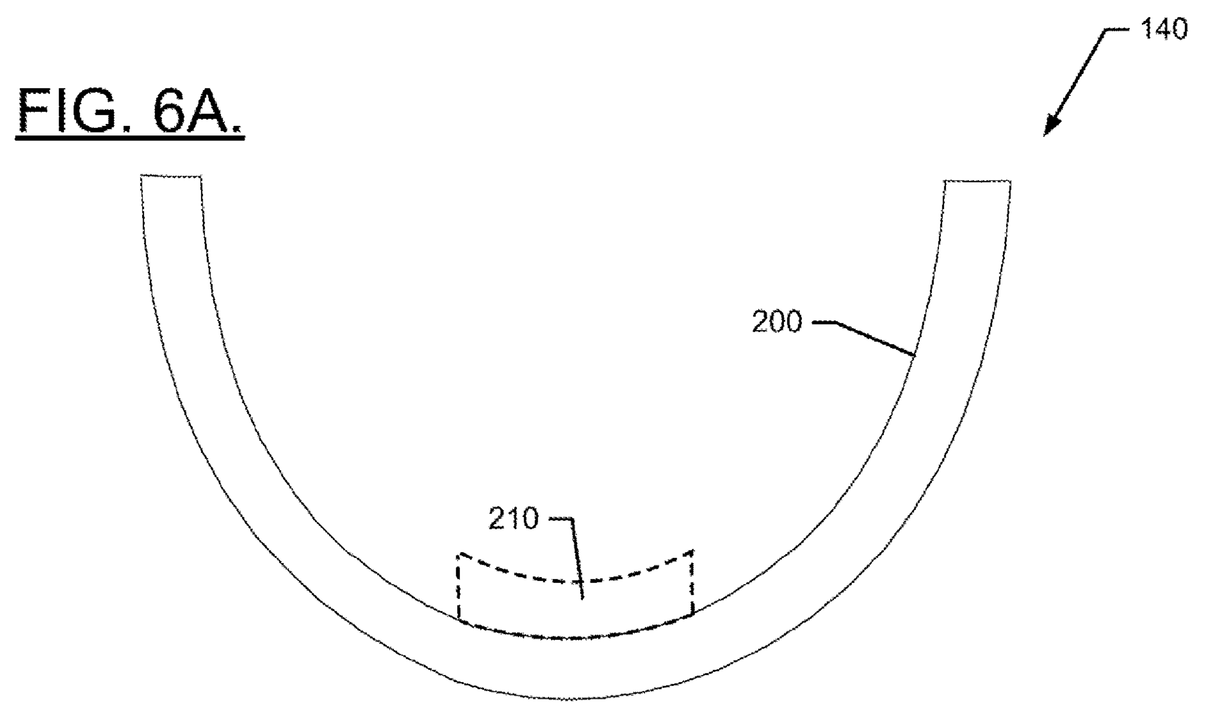
FIG. 6B illustrates a cross section view of the blade with a reinforcement strip applied to a bottom portion of the metallic strip according to an example embodiment.
Figure 6B:
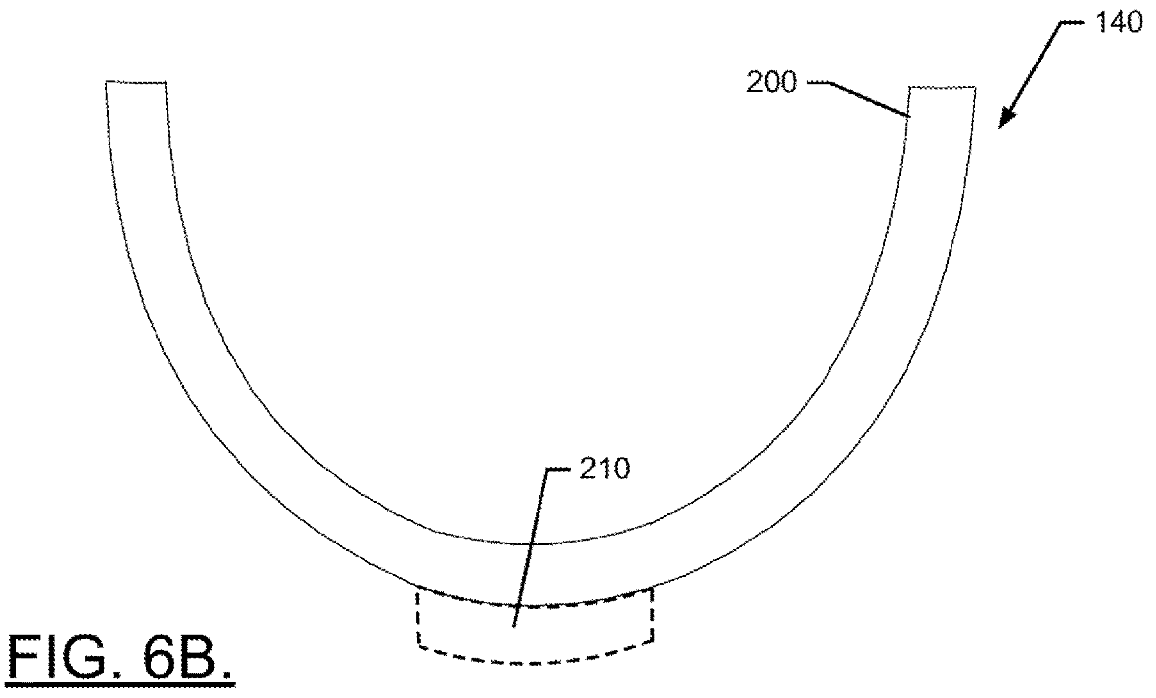
Figure 6C:
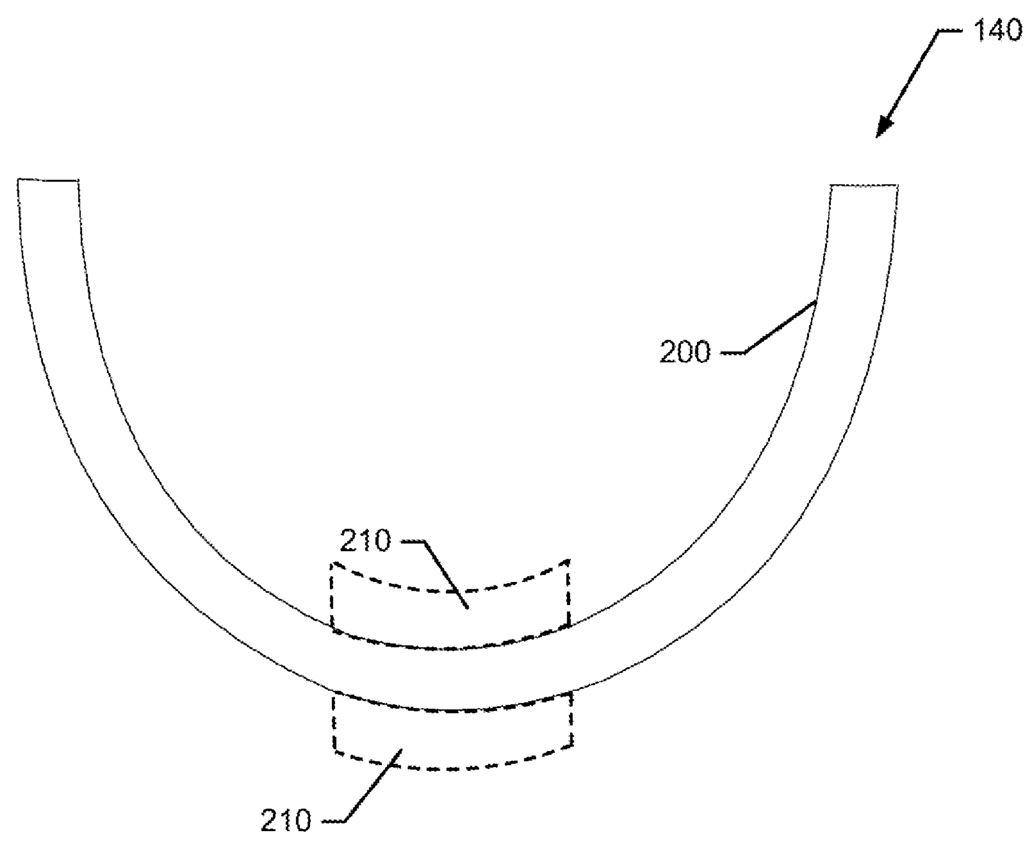
FIG. 6C illustrates a cross section view of the blade with a reinforcement strip applied to a top and bottom portion of the metallic strip according to an example embodiment.

FIG. 6A illustrates the reinforcement strip 210 being applied only to the top of the metallic strip 200 (at an apex or longitudinal center thereof). Meanwhile, FIG. 6B illustrates the reinforcement strip 210 being applied only to the bottom of the metallic strip 200, whereas FIG. 6C illustrates the reinforcement strip 210 being applied to both the top and the bottom of the metallic strip 200.

Figure 6D:
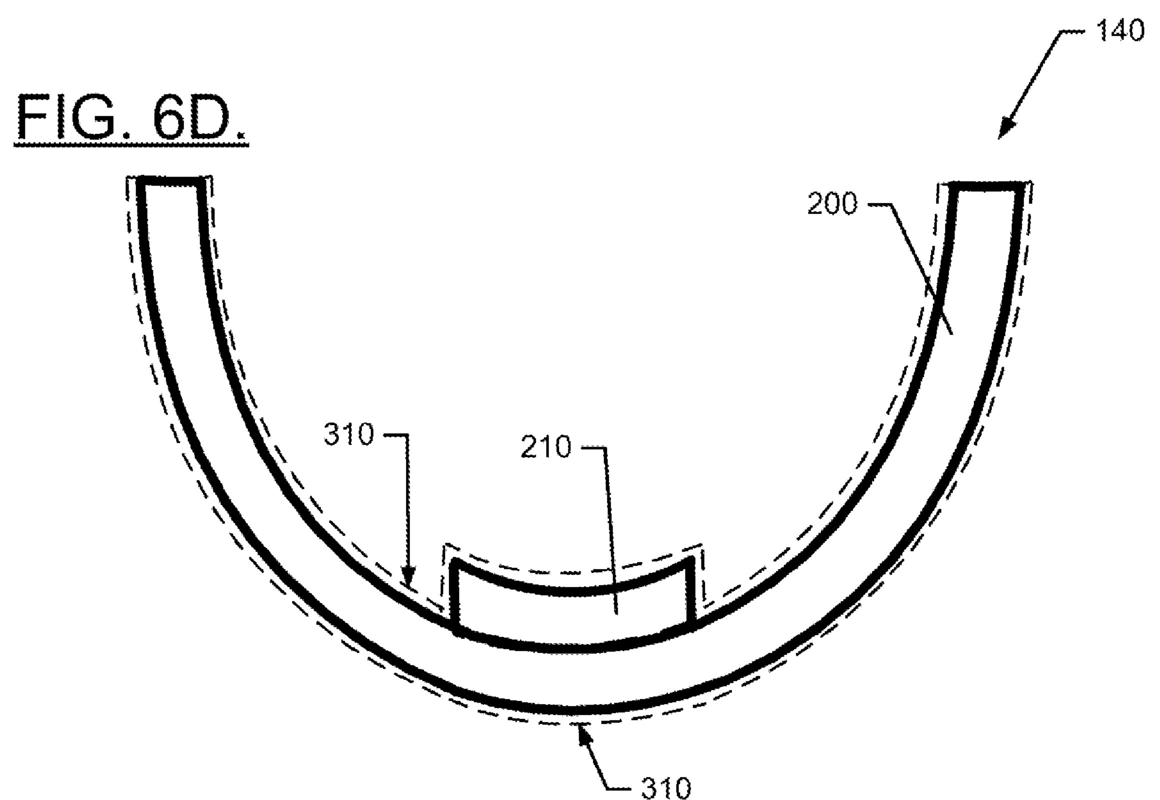
FIG. 6D illustrates a cross section view of the blade with films applied over the reinforcement strip to retain the reinforcement strip proximate to the metallic strip according to an example embodiment.
Figure 6E:
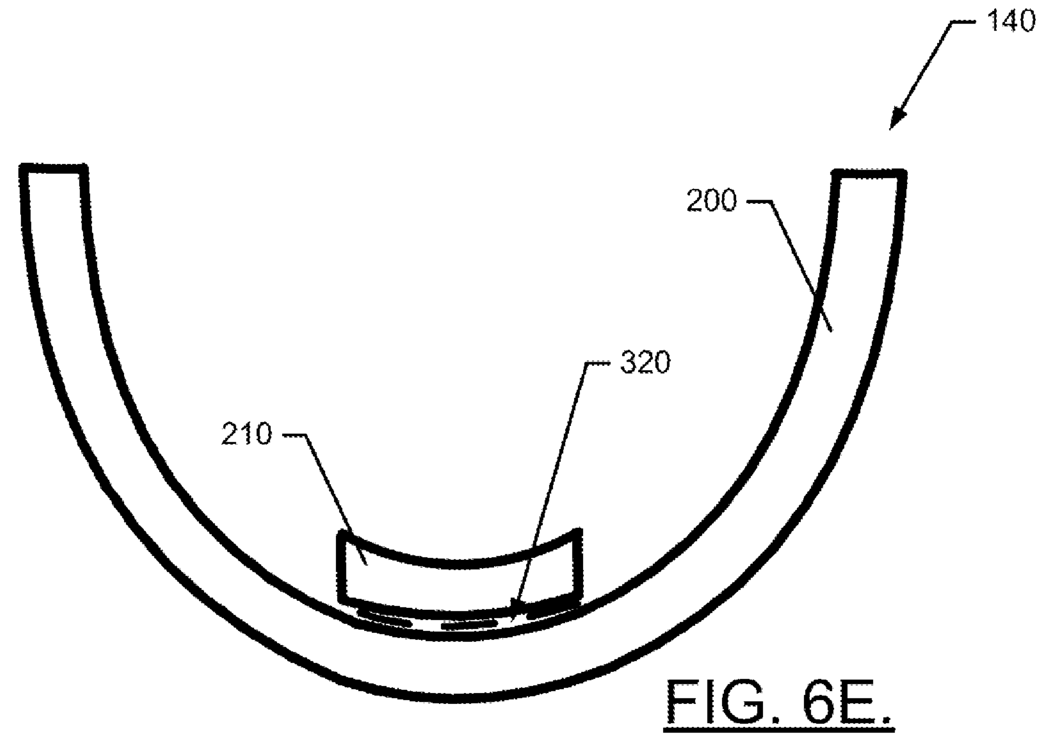
FIG. 6E illustrates a cross section view of the blade with an adhesive holding the reinforcement strip proximate to the metallic strip according to an example embodiment.

FIG. 6D shows the reinforcement strip 210 being held to the metallic strip 200 by being encapsulated next to the metallic strip 200 by a polymeric coating (or film) 310. In this regard, the polymeric coating 310 may be applied to the top and/or bottom sides of the metallic strip 200. When the polymeric coating 310 is applied, the polymeric coating 310 may hold the reinforcement strip 210 in contact with the metallic strip 200. As an alternative, the reinforcement strip 210 may be held to the metallic strip 200 with an adhesive 320 as shown in FIG. 6E. A combination of adhesive 320 and the polymeric coating 310 may also be employed in some cases.

Figure 7A:
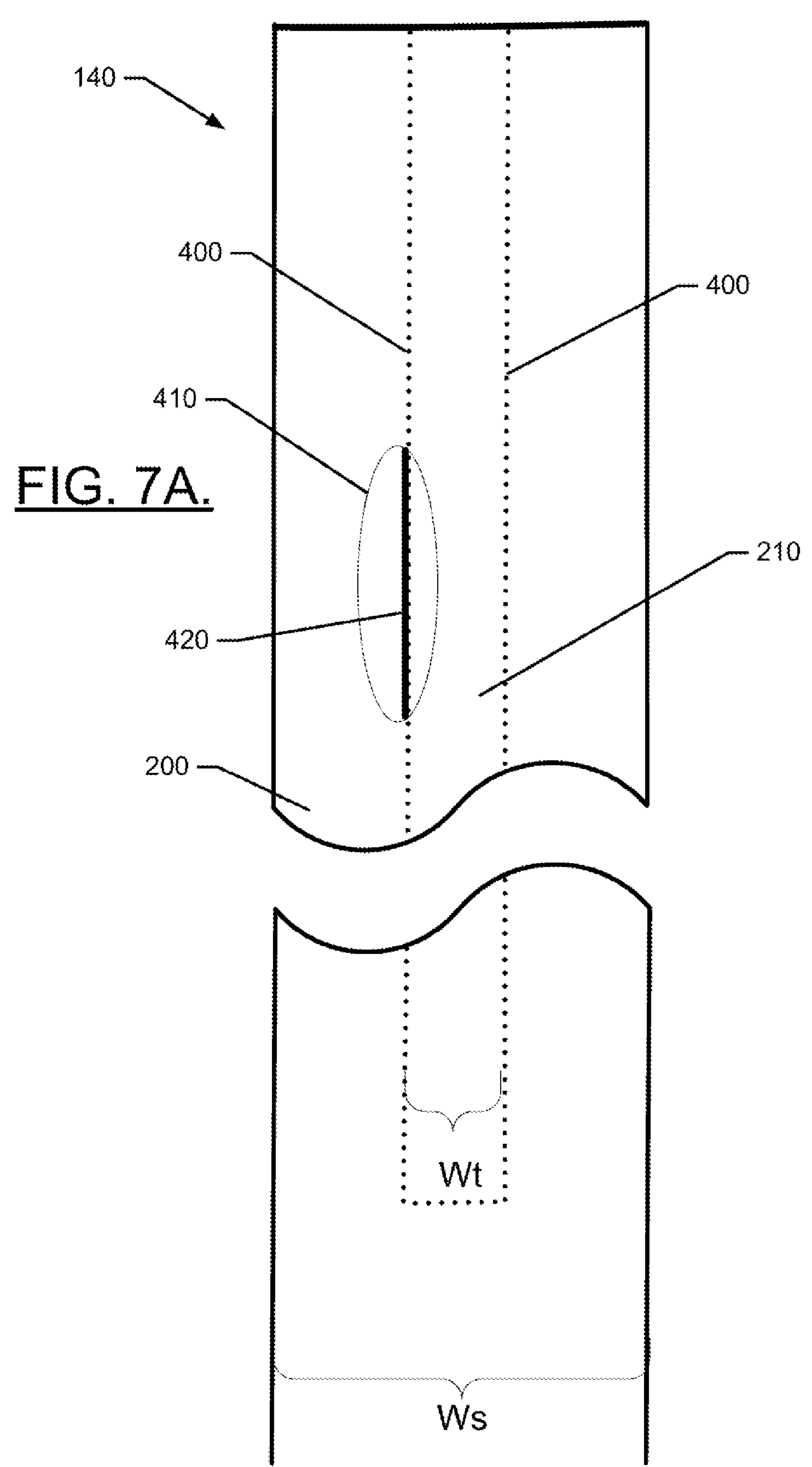
FIG. 7A illustrates a top view of the blade showing a seam weld in accordance with an example embodiment.
Figure 7B:
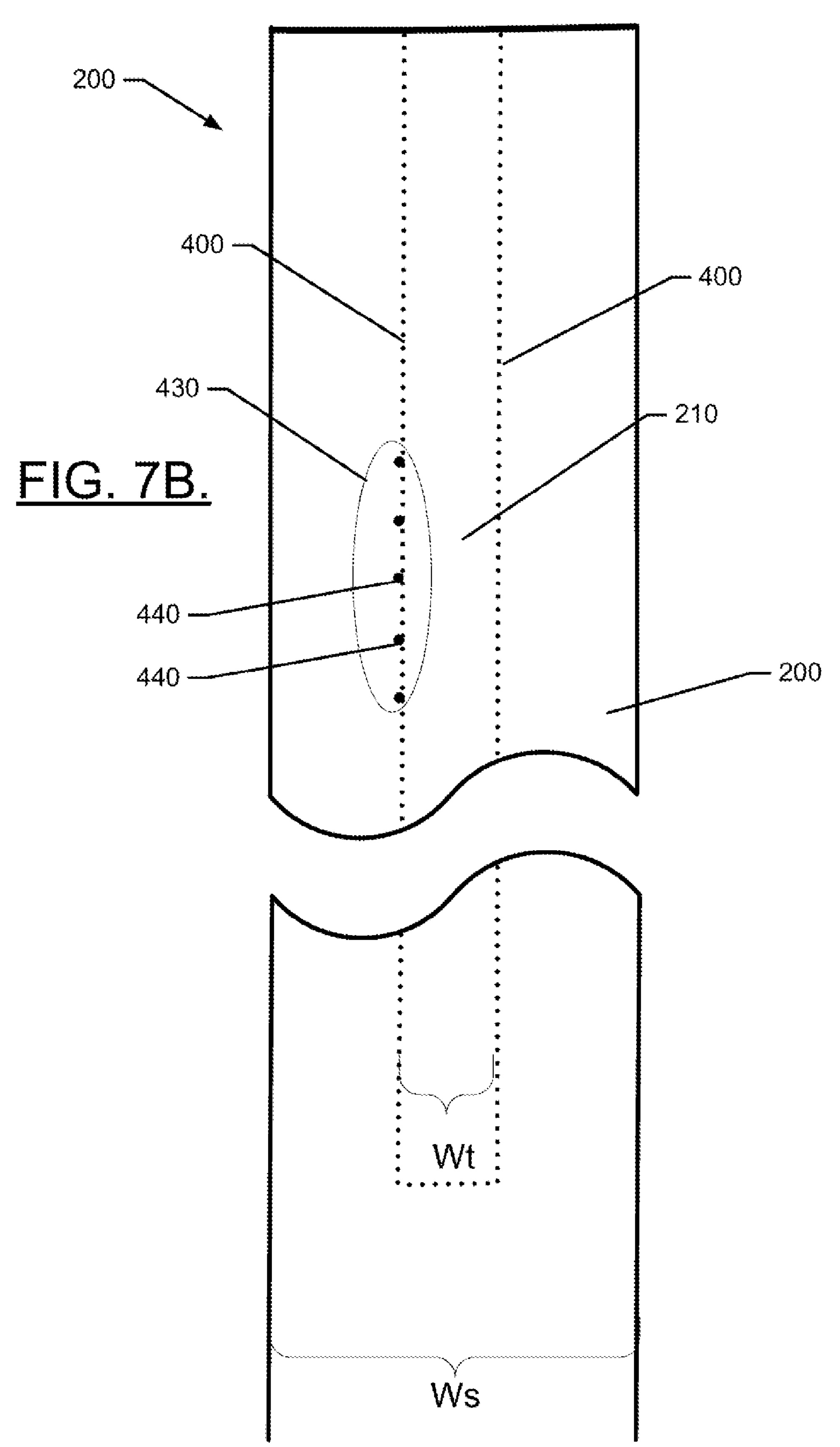
FIG. 7B illustrates a top view of the blade showing a series of spot welds in accordance with an example embodiment.
Figure 7C:
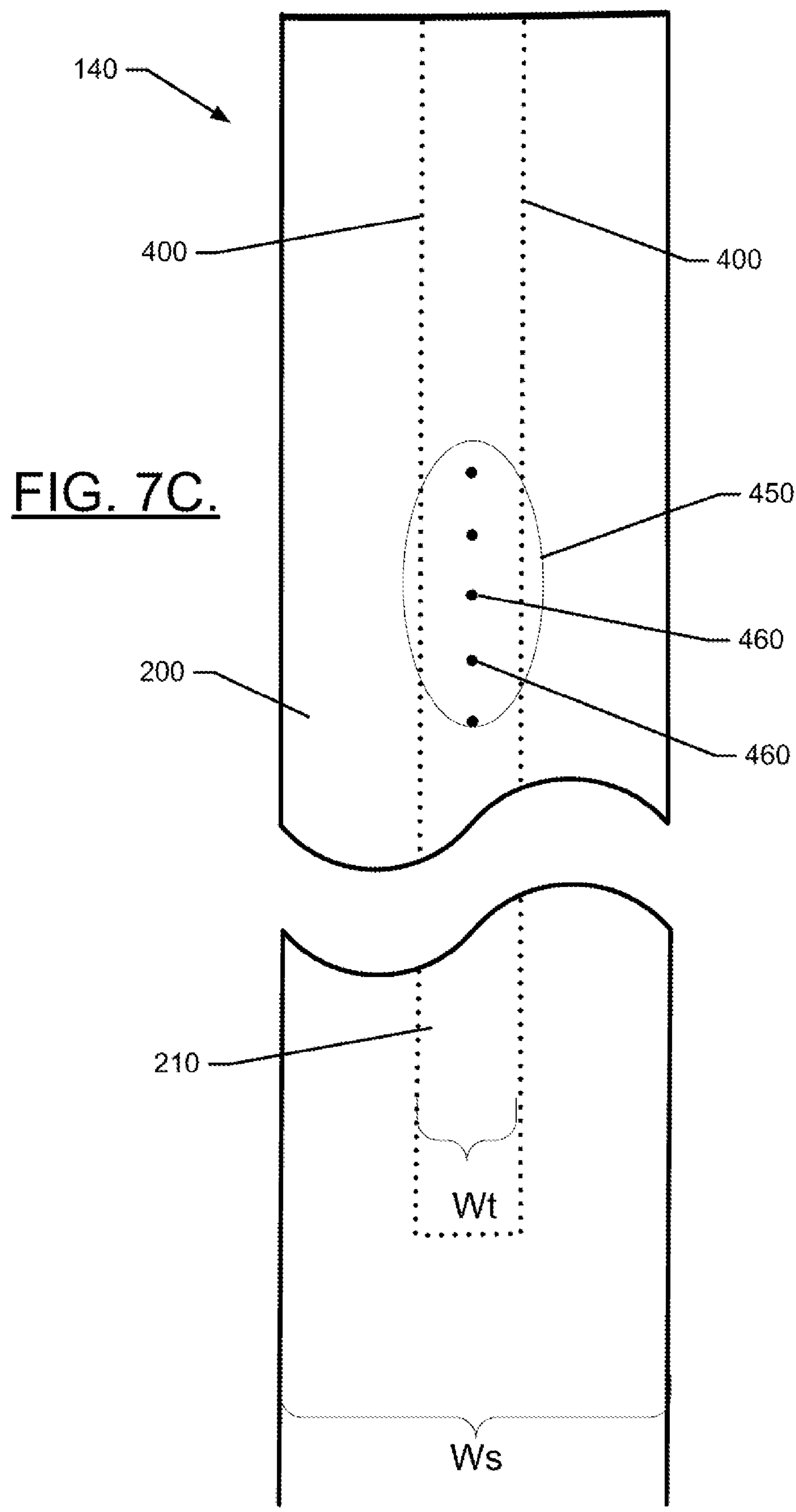
FIG. 7C illustrates a top view of the blade with fasteners holding the reinforcement strip proximate to the metallic strip in accordance with an example embodiment.

Still other methods may be employed to retain the reinforcement strip 210, either as alternatives to the methods described in reference to FIGS. 6D and 6E or in combination therewith. For example, FIG. 7, which is defined by FIGS. 7A, 7B and 7C illustrates three methods that could be used alone or in combination with those of FIGS. 6D and 6E. In this regard, FIG. 7A illustrates how an edge of the reinforcement strip 210 forms a seam 400 relative to the metallic strip 200. Detail window 410 shows a portion of the seam 400 in greater detail, and the seam 400 can be seen to have a seam weld 420 applied thereto. The seam weld 420 may be applied continuously over all portions of the seam 400 in some cases. However, in other case, the seam weld 420 may be applied only over a portion of the seam 400.

FIG. 7B illustrates a different fixing method applied to the seam 400. In this regard, detail window 430 illustrates the application of spot welds 440 to discrete locations along the seam 400. The spot welds 440 may be applied to spaced apart locations distributed along the seam 400. In some cases, the spot welds 440 may be substantially equidistant from each other along the entire length of the seam 400.

FIG. 7C illustrates yet another different fixing method applied to the reinforcement strip 200. In this regard, detail window 450 illustrates the application of fasteners 460 to discrete locations along the reinforcement strip 200. The fasteners 460 (e.g., rivets or the like) may be applied to spaced apart locations distributed along the reinforcement strip 200. In some cases, the fasteners 460 may be substantially equidistant from each other along the entire length of the reinforcement strip 200. Although shown spaced apart from the seam 400 in FIG. 7C, the fasteners 460 could alternatively be placed proximate to the seam 400 in some examples.

In an example embodiment, a measuring tape device (or a blade for such device) may be provided. The measuring tape device may include a housing having an aperture, a reel assembly enclosed within the housing, and a blade formed from a metallic strip of material having a first end configured to extend from the housing through the aperture and a second end configured to be wound on the reel assembly. The blade may further include a reinforcement strip applied to a longitudinal centerline of a selected portion of the metallic strip proximate to the first end. The reinforcement strip may be applied to a top and/or bottom of the metallic strip. A width of the reinforcement strip may be between about 10% to about 100% of a width of the metallic strip and a thickness of the reinforcement strip is between about 50% to about 300% a thickness of the metallic strip.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases the reinforcement strip may be applied to both the top and the bottom of the metallic strip. In an example embodiment, the reinforcement strip may be attached to the metallic strip via an adhesive. Alternatively or additionally, the reinforcement strip may be retained adjacent to the metallic strip by being encapsulated in a polymeric coating that coats both the reinforcement strip and the metallic strip. Alternatively or additionally, a seam is formed at an outer edge of the reinforcement strip, and the reinforcement strip is attached to the metallic strip via a seam weld along the seam or via a plurality of spot welds formed along the seam. Alternatively or additionally, the reinforcement strip may be attached to the metallic strip via a plurality of fasteners that pass through both the reinforcement strip and the metallic strip. In an example embodiment, the selected portion may extend to a distance of about 12 inches to about 96 inches from the first end. In some cases, the selected portion may be spaced apart from the first end by a distance of less than about 24 inches. In an example embodiment, the reinforcement strip may be continuous over the selected portion of the metallic strip. In some cases, the reinforcement strip may be formed of a plurality of individual strips that combine to extend over the selected portion of the metallic strip. In an example embodiment, the reinforcement strip may be made of steel or another metallic material. In some cases, the reinforcement strip and the metallic strip may each be cupped, and a curvature of the reinforcement strip may substantially match a curvature of an apex portion of the metallic strip.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blade for a measuring tape device, the blade comprising:

a first end at which an end hook is configurable;

a second end configured to be operably coupled to a reel assembly of the measuring tape device;

a metallic strip of material extending between the first end and second end; and a reinforcement strip applied to a longitudinal centerline of a selected portion of the metallic strip proximate to the first end, wherein the reinforcement strip is applied to a top or bottom of the metallic strip, wherein a width of the reinforcement strip is between about 10% to about 100% of a width of the metallic strip and a thickness of the reinforcement strip is between about 50% to about 300% a thickness of the metallic strip, and wherein the reinforcement strip is retained adjacent to the metallic strip by being encapsulated in a polymeric coating that coats both the reinforcement strip and the metallic strip.

2. The blade of claim 1, wherein the reinforcement strip is applied to both the top and the bottom of the metallic strip.

3. The blade of claim 1, wherein the reinforcement strip is attached to the metallic strip via an adhesive.

4. The blade of claim 1, wherein a seam is formed at an outer edge of the reinforcement strip, and wherein the reinforcement strip is attached to the metallic strip via a seam weld along the seam.

5. The blade of claim 1, wherein a seam is formed at an outer edge of the reinforcement strip, and wherein the reinforcement strip is attached to the metallic strip via a plurality of spot welds formed along the seam.

6. The blade of claim 1, wherein the reinforcement strip is attached to the metallic strip via a plurality of fasteners that pass through both the reinforcement strip and the metallic strip.

7. The blade of claim 1, wherein the selected portion extends to a distance of about 12 inches to about 96 inches from the first end.

8. The blade of claim 7, wherein the selected portion is spaced apart from the first end by a distance of less than about 24 inches.

9. The blade of claim 1, wherein the reinforcement strip is continuous over the selected portion of the metallic strip.

10. The blade of claim 1, wherein the reinforcement strip is formed of a plurality of individual strips that combine to extend over the selected portion of the metallic strip.

11. The blade of claim 1, wherein the reinforcement strip is made of steel or another metallic material.

12. The blade of claim 1, wherein the reinforcement strip and the metallic strip are each cupped, and wherein a curvature of the reinforcement strip substantially matches a curvature of an apex portion of the metallic strip.

13. A measuring tape device comprising:

a housing having an aperture;

a reel assembly enclosed within the housing; and a blade formed from a metallic strip of material having a first end configured to extend from the housing through the aperture and a second end configured to be wound on the reel assembly, wherein the blade further comprises a reinforcement strip applied to a longitudinal centerline of a selected portion of the metallic strip proximate to the first end, wherein the reinforcement strip is applied to a top or bottom of the metallic strip, wherein a width of the reinforcement strip is between about 10% to about 100% of a width of the metallic strip and a thickness of the reinforcement strip is between about 50% to about 300% a thickness of the metallic strip, and wherein a seam is formed at an outer edge of the reinforcement strip, and wherein the reinforcement strip is attached to the metallic strip via a seam weld along the seam.

14. The device of claim 13, wherein the reinforcement strip is applied to both the top and the bottom of the metallic strip.

15. The device of claim 13, wherein a seam is formed at an outer edge of the reinforcement strip, and wherein the reinforcement strip is attached to the metallic strip via:

an adhesive, a plurality of spot welds formed along the seam, a plurality of fasteners that pass through both the reinforcement strip and the metallic strip, or being encapsulated in a polymeric coating that coats both the reinforcement strip and the metallic strip.

16. The device of claim 13, wherein the selected portion extends to a distance of about 12 inches to about 96 inches from the first end.

17. The device of claim 16, wherein the selected portion is spaced apart from the first end by a distance of less than about 24 inches.

18. The device of claim 13, wherein the reinforcement strip is continuous over the selected portion of the metallic strip, or wherein the reinforcement strip is formed of a plurality of individual strips that combine to extend over the selected portion of the metallic strip.

19. The device of claim 13, wherein the reinforcement strip and the metallic strip are each cupped, and wherein a curvature of the reinforcement strip substantially matches a curvature of an apex portion of the metallic strip.

20. A blade for a measuring tape device, the blade comprising:

a first end at which an end hook is configurable;

a second end configured to be operably coupled to a reel assembly of the measuring tape device;

a metallic strip of material extending between the first end and second end; and a reinforcement strip applied to a longitudinal centerline of a selected portion of the metallic strip proximate to the first end, wherein the reinforcement strip is applied to a top or bottom of the metallic strip, wherein a width of the reinforcement strip is between about 10% to about 100% of a width of the metallic strip and a thickness of the reinforcement strip is between about 50% to about 300% a thickness of the metallic strip, and wherein a seam is formed at an outer edge of the reinforcement strip, and wherein the reinforcement strip is attached to the metallic strip via a seam weld along the seam, extending from the first end.

* * * * *